Patented Jan. 25, 1938

2,106,410

UNITED STATES PATENT OFFICE 2,106,410

CERAMIC COMPOSITION

Andrew Malinovszky, South Gate, Calif.

No Drawing. Application January 18, 1936, Serial No. 59,793

8 Claims. (Cl. 106—36.2)

This invention relates to the art of making ceramic bodies and in particular to a glazed body which is produced by a once-fired process.

In the usual methods of making glazed ceramic articles, such as tile and blocks, a body material or bisque is formed by casting, molding or pressing, and then drying and vitrifying, after which a glazing composition is applied to desired surfaces, and the articles are refired to melt or mature the glazing composition, and to fuse or attach it to the previously vitrified body or bisque. This procedure has heretofore been found necessary because a higher burning temperature was required to produce sufficient strength in the bisque or body portion than could be used for maturing the glaze; also it was necessary to burn the body portion at a sufficiently high temperature so that the firing shrinkage would be substantially completed, and no further changes in volume or shape would occur on the subsequent lower temperature heating in the glazing operation. This high temperature firing is not only expensive because of the fuel consumption, but also because of the production of large number of rejectable pieces, due to warping and cracking.

I have discovered that by the use of a body composition composed essentially of the mineral tremolite (calcium magnesium silicate), bentonite or montmorillonite as a low temperature binder, cyanite, and boric acid or a borate such as barium, calcium, lead or zinc borate, which composition may be shaped and a glazing material applied to the desired surfaces, that I can produce glazed ware such as tile in a single burning operation, with consequent reduction in the cost of operations as well as a reduction in the losses by rejection of imperfect articles.

It is an object of this invention, therefore, to provide a method of producing ceramic bodies having glazed surfaces by a single firing operation. Another object of this invention is to provide a method of producing ceramic bodies of low coefficient of expansion having tremolite as an important ingredient. A further object is to provide a composition of ceramic materials by the use of which ceramic bodies having glazed surfaces and desirable physical properties may be readily and economically produced.

These and other objects, uses and advantages of this invention will become apparent to those skilled in the art from the following detailed description of the method and compositions to be employed in applying this invention.

The base material which I employ in my compositions is the mineral tremolite, which is a naturally occurring crystalline mineral of well defined character. It is considered by mineralogical authorities (Dana, Textbook of Mineralogy, page 400, 1908 Ed.) to be a lime magnesium amphibole composed chiefly of and sometimes wholly of, silicates of magnesium and calcium, in which three-fourths of the non-silicious ingredient is magnesia, and one-fourth is lime, by molecular proportions, the formula being $3MgO.CaO.4SiO_2$. Other minerals of similar compositions and physical properties may also be used, for example wollastonite $(CaO.SiO_2)$, and synthetically produced materials of similar compositions and properties may be employed. Tremolite has a fusion point of pyrometric cone No. 19 or approximately 2721° F. At the temperature of firing of my ceramic compositions, which is about 1900 to 2460° F., the tremolite is little changed, and preserves its characteristic long flat crystalline shapes. Photomicrographs of my fired bodies containing tremolite show that the original material is practically unchanged after firing, except for possible surface adherence of the bonding materials. Tremolite contains no water, either free or combined chemically, and therefore does not fly to pieces when heated suddenly as do many ceramic raw materials. The tremolite, during the firing process, expands and contracts in such a way that the glazing composition fits perfectly, and does not crack nor chip upon cooling, nor upon subsequent temperature changes, such as atmospheric.

As a low temperature binder for the tremolite material, I prefer to use bentonite, bentonitic clay, or other amorphous forms of clay, the chief constituent of which is montmorillonite, which is believed to have a formula of

$MgO.Al_2O_3.5SiO_2.nH_2O$.

Bentonite has a large amount of combined water and has a capacity for absorbing water due to its highly colloidal nature, so that a small proportion may be dispersed throughout the mass to coat all the surfaces of the mineral particles. But bentonite also has the property of large shrinkage during drying and firing, which may cause warpage and uneven shrinkage of the shapes. To offset this shrinkage of the bentonite, particularly when large proportions of bentonite are used, I use the mineral cyanite or its equivalent as a counter-acting agent. Either raw or calcined cyanite has the property of expanding during heating and of changing by heating to red heat to a larger volume than the original. The proportion of cyanite to the bentonite is determined by the amount of shrinkage of the particular bentonitic clay used, and the temperature to which the bodies are to be heated in the process. I have ordinarily used cyanite in an amount equal to one-third to one-half of the weight of the bentonitic clay.

Other materials to offset the contraction of the bentonitic clay may be used either alone or mixed with cyanite, for example, sillimanite, andalusite, dumortierite and certain types of non-shrinking and expanding clays. Of the latter materials, I have used a California clay known as Harrington No. 2 in my composition in place of cyanite to offset the shrinkage of the bentonite.

To provide a fluxing agent to more thoroughly bond the particles together after the heating process, and to hold the glaze to the body, I add a small amount of a borate, which upon fusing during firing forms with the clay and other silicates a low firing bonding agent comprised of borosilicates. I may use any suitable borate or boron compound such as borax, boric acid, barium borate, calcium borate, lead borate, zinc borate, or one of the boro-silicate glasses, but prefer to use a water insoluble material containing boron to avoid the segregation and scumming of the water-soluble forms when the tempering water evaporates at the surfaces, and to avoid the uncontrolled mixing of boron fluxing materials into the glaze composition when this is applied. I prefer to use specifically boric acid or boric oxide because of its relative insolubility and its reactivity with the silicates. The borate bonding material forms a hard dense body, has low shrinkage, and low coefficient of expansion and contraction.

As in most ceramic bodies, certain proportions of other inert ingredients than the principal one may be incorporated in the mixture, with suitable compensating changes in the amounts of the bonding agent and expanding materials. In the compositions of this invention, I have found that filler materials to about one-fourth to one-third of the whole may be included. These filler materials may include silica, clay, actinolite, serpentine, steatite, soapstone, talc, pyrophyllite and the like.

The proportions of the various ingredients which may be used in my process, and for the production of my single-burned glazed ware, may be varied over a rather wide range. The addition of tremolite, or its equivalents, to other ceramic bodies is very beneficial, especially to products which are exposed to continual thermal changes. For this purpose, amounts as low as 5 parts and as high as 85 parts of tremolite per one hundred parts have been successfully used. I will illustrate the use of tremolite in several typical compositions, to indicate something of the range of compositions, in particular for "one-fire" tiles and similar bodies.

For example, for wall tiles made by a semi-dry pressing process using about seven percent moisture, I employ 55 parts of tremolite, 40 parts of bentonite clay, and 5 parts of barium borate. To off-set the shrinkage of the bentonite clay in this composition, thereby giving a higher percentage of perfect finished tile, I have used cyanite to replace part of the bentonite giving a composition of 55 parts tremolite, 15 parts cyanite, 25 parts bentonite clay and 5 parts of barium borate.

As another example of my composition, I have used for vitrified tiles and electric insulators, a composition having 80 parts tremolite, 5 parts bentonite, and 15 parts of barium borate.

As still another example, for X-ray wall tile, I use 40 parts barium oxide, 5 parts of boric oxide, 10 parts of lead oxide, 3 parts bentonite, and 42 parts of tremolite.

For use as a casting slip, I have used tremolite 60 parts, cyanite 5 parts, soapstone 10 parts, bentonite 10 parts, barium borate 15 parts. For large intricate pieces, a strong ball clay may also be added, depending upon the size and shape of the pieces, to the extent of from 5 to 25 parts; also an electrolyte such as sodium silicate and sodium tannate solution may be used to properly disperse the slip for the casting process.

In all cases the different components are ground together so that all particles will pass a 100 to 150 mesh screen, and the mass mixed with sufficient water to permit forming.

As indicated, the tile or bodies may be formed by a variety of processes, well known to the ceramic art, such as pressing, semi-dry pressing, hand moulding, jiggering, or slip casting, and the compositions may be varied as to water, plastic clays, and plasticizers to adapt the mixes to working by these several forming processes.

After the body is formed and sufficiently dried, if desired a glaze composition may be applied to the "green" or unfired pieces, following which the drying is repeated if necessary, and the bodies are fired, preferably in a tunnel kiln, at temperatures which will give a dense, solid body and will also melt the glaze composition and cause it to flow out smooth and to adhere to the "body" portion in a manner satisfactory for the production of glazed ceramic ware. These temperatures are usually in the range from 1900 to 2462° F.

For the glazing composition, many types and compositions may be used depending upon the color, thickness of glaze, surface effects, resistance of glaze to chemical reagents, etc., the essential requirement being that the glaze will properly mature within the temperature and time of firing required by the "body" portion. One composition which I have satisfactorily used in my one-fire process consists of a frit containing 35 parts silica, 20 parts borax, 35 parts litharge, 6 parts zinc oxide, 4 parts calcium fluoride. This frit composition after fusing and grinding is then added in the proportion of 66 parts to 3 parts of china clay, 2 parts of ball clay, 15 parts silica, and 14 parts of white lead. This composition is applied by spraying or dipping or by other suitable methods to the desired surfaces of the dried, or partly dried, unfired pieces of tremolite-containing ware made as previously described hereinabove, and the bodies fired for a short time to mature the glaze and bond the "body", at temperatures about 1920° F.

My entire process of forming, drying, applying glaze, again drying, firing, and cooling requires a time of only about 14 hours, and is therefore much more economical in both time and fuels consumed than are the processes now commonly used.

Glazed tile made by my single firing process are as strong as the average strength of two-fired tiles, being more than 4000 pounds per square inch. Tests for glaze frit made in accordance with the standard autoclave method developed by the U. S. Bureau of Standards indicate no crazing of the glaze on the tiles. Forty cycles of heating and quenching and sixteen cycles of freezing and thawing developed no crazing in my tile. The coefficient of expansion of my tremolite wares is small.

By the term "tremolite" as used in these specifications and the claims is meant not only the natural mineral known as tremolite, but all other crystalline mineral materials either natural or synthetic, having physical characteristics and analogous chemical compositions similar to natural mineral tremolite, that is, magnesium calcium silicate, and having no water of composition. The term "cyanite" as used in these specifications and claims is meant to include not only the natural mineral known as cyanite, but also all other crystalline mineral materials, either natural or synthetic, having physical characteristics during and after firing in a ceramic composition similar to the natural mineral cyanite.

Although several combinations of ingredients have been disclosed hereinabove and methods of operation have been described for the preferred method of carrying out my invention, it is to be understood that the invention is not limited to the precise steps, ingredients, or proportions set forth above, but includes all such modifications and changes as come within the scope of the appended claims.

I claim:

1. A ceramic composition comprising tremolite, bentonitic clay, and cyanite.

2. A ceramic composition comprising tremolite, bentonite clay, a boron compound, and cyanite.

3. A ceramic composition comprising tremolite, bentonite clay, and from 5 to 15 parts per hundred of a boron compound.

4. A vitrified ceramic composition comprising tremolite in unchanged crystalline structure and cyanite, and a bonding material which begins to fuse at about 1400° F. but which does not cause over-vitrification of the composition at temperatures from 1900 to 2462° F.

5. A vitrified ceramic composition comprising tremolite in unchanged crystalline structure and cyanite, and a bonding material which begins to fuse at about 1400° F.

6. A ceramic manufacture comprising a shaped bisque body containing tremolite in unchanged crystalline structure with cyanite and a fused borosilicate binder, and a heat-fluxed glaze fused to portions of the surface of said bisque body.

7. A ceramic manufacture comprising a shaped body containing tremolite in unchanged crystalline structure and a fused borosilicate binder, and having a heat-fluxed glaze fused to portions of the surface of said body.

8. A vitrified ceramic composition comprising tremolite in unchanged crystalline structure and cyanite, a bonding material and a surface glazing material, the sintering point of the bonding material and the maturing temperature of the glazing material being between about 1900 and 2462° F.

ANDREW MALINOVSZKY.